United States Patent [19]

Mori

[11] Patent Number: 4,541,414
[45] Date of Patent: Sep. 17, 1985

[54] APPARATUS FOR COLLECTING SUNLIGHT

[76] Inventor: Kei Mori, 3-16-3-501, Kaminoge, Setagaya-ku, Tokyo, Japan

[21] Appl. No.: 633,076

[22] Filed: Jul. 23, 1984

Related U.S. Application Data

[63] Continuation of Ser. No. 368,746, Apr. 15, 1982, abandoned.

[51] Int. Cl.⁴ ............................................. F24J 3/02
[52] U.S. Cl. .................................... 126/438; 126/439; 126/440; 350/628
[58] Field of Search ................. 126/440, 438, 439; 350/96.1, 293, 294, 440, 442, 445

[56] References Cited

U.S. PATENT DOCUMENTS

| | | | |
|---|---|---|---|
| 842,788 | 1/1907 | Huntoon | 126/440 |
| 972,373 | 10/1910 | Hebig | 350/293 |
| 1,302,363 | 4/1919 | Graham | 126/440 |
| 1,683,266 | 9/1928 | Shipman | 126/440 |
| 3,343,445 | 9/1967 | Norman | 350/293 |
| 3,536,434 | 10/1970 | Frank | 350/293 |
| 3,580,679 | 5/1971 | Perkin | 350/442 |
| 3,869,199 | 3/1975 | Cummings | 350/293 |
| 3,899,672 | 8/1975 | Levi-Setti | 350/293 |
| 4,003,638 | 1/1977 | Winston | 350/293 |
| 4,017,962 | 4/1977 | Palmer | 350/96.1 |
| 4,026,267 | 5/1977 | Coleman | 126/440 |
| 4,029,077 | 6/1977 | Gorniak | 126/440 |
| 4,069,812 | 1/1978 | O'Neill | 126/440 |
| 4,114,592 | 9/1978 | Winston | 126/440 |
| 4,201,197 | 5/1980 | Dismer | 350/96.1 |
| 4,225,782 | 9/1980 | Kuppenheimer | 350/293 |
| 4,240,692 | 12/1980 | Winston | 350/293 |
| 4,253,880 | 3/1981 | Bellugue | 350/293 |
| 4,257,401 | 3/1981 | Daniels | 350/445 |
| 4,282,858 | 8/1981 | Bowers | 126/440 |
| 4,307,936 | 12/1981 | Ochiai | 350/96.1 |

FOREIGN PATENT DOCUMENTS

WO81/02624  9/1981  World Intel. Prop. Org. .... 126/439

Primary Examiner—Larry Jones
Attorney, Agent, or Firm—Merchant, Gould, Smith, Edell, Welter & Schmidt

[57] ABSTRACT

A sunlight collector for collecting, in particular, diffuse radiation of sunlight comprising a cylinder having a relatively wide entrance aperture for receiving the natural light and a relatively narrow exit aperture for introducing the concentrated diffuse radiation into a light conductor. The inner wall of the cylinder has a plurality of tapered surfaces arranged in series and in which said tapered surfaces are of total reflection. The solar energy emanated from the exit aperture is of a higher density than the incident energy density and can be effectively utilized to illuminate the interior of a room.

8 Claims, 3 Drawing Figures

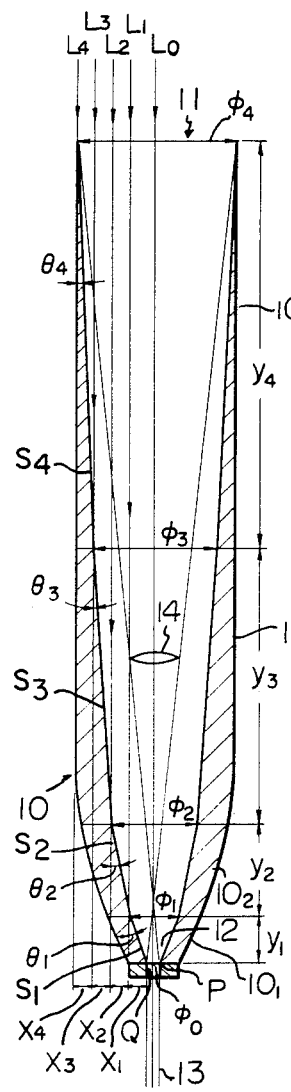
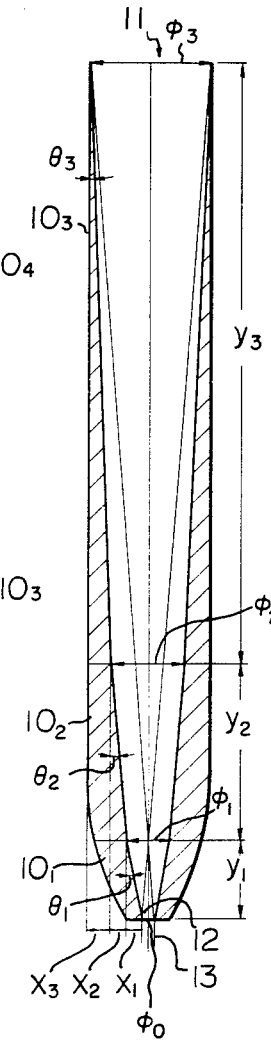
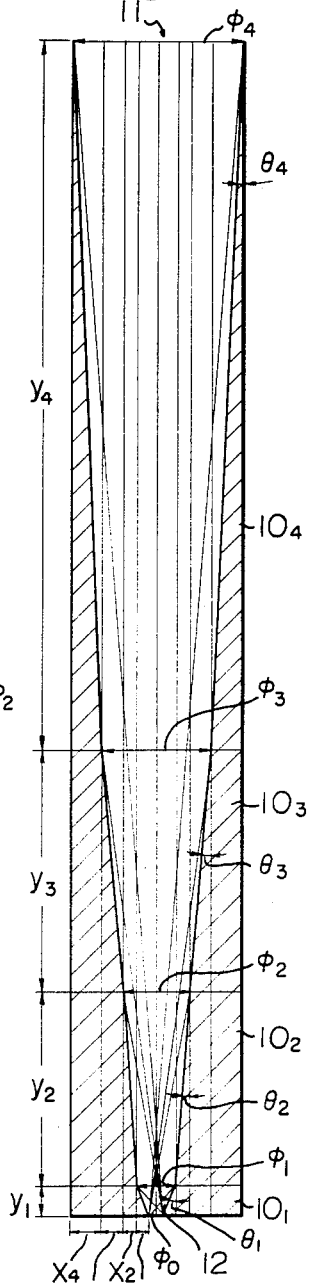

4,541,414

APPARATUS FOR COLLECTING SUNLIGHT

This is a continuation of application Ser. No. 368,746, filed Apr. 15, 1982, now abandoned.

FIELD OF THE INVENTION

The present invention relates to a novel sunlight energy collector. More particularly, the present invention relates to an apparatus in a fixed position for collecting sunlight, in which incidented parallel components of diffuse radiation of sunlight can be concentrated, without using a complicated lens system, and introduced into a light conductor, or guide, at a high efficiency.

BACKGROUND OF THE INVENTION

Recently, energetic developments and research have been made in various fields for effective utilization of sunlight energy with a view to meeting the requirement of saving energy.

I was quick to note the effective utilization of sunlight energy for illumination and have made various proposals. The most effective utilization of sunlight energy is to utilize sunlight energy in the form of light energy directly for illumination in the room without converting it to other forms of energy, such as electricity or heat.

In the known prior art there is proposed an apparatus capable of transmitting sunlight collected on the exterior of a house to a place where illumination is required, e.g., the interior of a room, by means of a light conductor. For this purpose, in the prior art, sunlight is concentrated by using a lens system, for example, a complicated arrangement of Fresnel lenses, and is introduced into the light conductor. In addition, since the above-mentioned apparatus is mainly intended to collect direct radiation of sunlight, it is necessary for said apparatus to operate precisely and smoothly to track the movement of the sun.

With this apparatus, the tracking mechanism of the apparatus is apt to become complicated, the positioning of the lens system is difficult, and the registering operation of the focus of the lens system with the inlet of the light conductor is quite dangerous, as well as requiring very great skill by the operator.

Other known prior arts have employed a parabolic reflector for concentrating direct radiation of sunlight at a focus point at which a light conductor is disposed. However, a parabolic reflector, in order to provide effective concentration, is comparatively large and requires a precise parabolic surface.

Thus, the optimum apparatus of this kinds was not achieved until the present.

SUMMARY OF THE INVENTION

The present invention is directed to a collecting apparatus, used in a fixed position, for collecting parallel components of diffuse radiation of sunlight, i.e., the scattered sunlight reflecting on molecules or suspending corpuscles in the atmosphere and the reflected sunlight from the surface of the earth, and is not directed to an apparatus for collecting the direct radiation of sunlight.

The invention as claimed is intended to provide an apparatus for collecting diffuse radiation of sunlight, in which incidented parallel components of diffuse radiation can be concentrated, without using a lens system, and effectively introduced into a light conductor, so that the apparatus is simple in construction and low in manufacturing cost. Furthermore, since a complicated lens system is unnecessary, the registering operation of the focus point of the lens system with the inlet of the light conductor, which is quite dangerous and requires very great skill by the operator, can be completely eliminated.

BRIEF DESCRIPTION OF THE DRAWINGS

A preferred embodiment of the invention will now be described in detail with reference to the accompanying drawings, wherein the same reference numerals are used to designate similar parts throughout the different views, in which:

FIGS. 1 through 3 are vertical longitudinal sectional views showing the construction of an apparatus for collecting diffuse radiation of sunlight according to the present invention.

DETAILED DESCRIPTION OF THE INVENTION

FIG. 1 is a vertical longitudinal sectional view illustrating the construction of one embodiment of the present invention. Reference numeral 10 denotes an apparatus for collecting sunlight according to the present invention. As shown in FIG. 1, the apparatus is constructed, for example, in the form of a cylinder. On the top of the cylinder 10 a relatively wide entrance aperture 11, exposed to incident diffuse radiation, is provided and a relatively narrow exit aperture 12 is provided on the bottom of the cylinder 10 to which a light conductor 13, such as an optical fiber 13, is fixedly inserted.

On the inner wall of the cylinder 10 a series of tapered surfaces, symmetrical about the cylinder axis, are formed. Said tapered surfaces are made with a total reflection surface.

During operation of the apparatus, incidented parallel components of diffuse radiation, which are parallel to the longitudinal axis of the cylinder 10, enter from the relatively wide entrance aperture 11, reflect on the tapered surfaces, are concentrated at the relatively narrow exit aperture 12 and, finally, are introduced into the light conductor 13, at a high efficiency. Consequently, the captured diffuse radiation by the cylinder 10 may be transmitted to a place where illumination is required, by means of said light conductor 13.

In other words, the inner wall of the cylinder 10 has a plurality of discrete tapered surfaces (for example the four tapered surfaces $S_4$, $S_3$, $S_2$ and $S_1$ shown in FIG. (1) contiguously arranged in series along the axis of the cylinder. The surfaces $S_4$, $S_3$, $S_2$ and $S_1$ are the inner, reflective surfaces of portions $10_4$, $10_3$, $10_2$ and $10_1$ respectively. Each surface is linear when viewed in longitudinal cross-section. Similar surfaces are present in the structures shown in FIG. 2 and 3. The surfaces $S_4$ through $S_1$ appear as lines when viewed in longitudinal cross-sections.

As can be seen in FIG. 1, the inner wall of the cylinder 10 is provided with, for example, four tapered surfaces. Supposing that the tapered angles $\theta_1$, $\theta_2$, $\theta_3$ and $\theta_4$ of the respective portions $10_1$, $10_2$, $10_3$ and $10_4$ are 20°, 10°, 5° and 2.5°, respectively, and supposing that $X_1 = X_2 = 10.9$ mm, $X_3 = 15.7$ mm, $X_4 = 11.8$ mm, $Y_1 = 30$ mm, $Y_2 = 60$ mm, $Y_3 = 180$ mm, $Y_4 = 270$ mm and the diameter of the exit aperture $\phi_0$ is 10 mm, then the following relations can be derived.

$\phi_1 = 31.8$ mm, $\phi_2 = 53.0$ mm, $\phi_3 = 84.4$ mm, $\phi_4 = 108.0$ mm and resulting with $\phi_4{}^2/\phi_0{}^2 \approx 116.7$. When the reflective loss can be assumed as being negligibly small, the optical energy at the exit aperture 12 will be about 117 times the density than that at the entrance aperture 11.

The present invention will now be described in more detail with reference to FIG. 1.

As mentioned previously, according to the present invention, four tapered surfaces, being arranged in series, are provided on the inner wall of the cylinder 10. Therefore, when the parallel components of the diffuse radiation are received in the entrance aperture 11, the diffuse radiation incidented at the range between $L_3$ through $L_4$ is reflected on the portion $10_4$, and is incidented and reflected on the portion $10_2$, and finally introduced into the exit aperture 12. The diffuse radiation received near the point $L_4$ is finally introduced into the right-side point P; alternatively the natural light received near the point $L_3$ is finally introduced into the left-side point Q of the exit aperture 12. In such a case, the portions $10_3$ and $10_1$ are not utilized as the reflective surface of said received diffuse radiation.

The diffuse radiation incidented at the range between $L_2$ through $L_3$ is multiply reflected on the portions $10_3$ and $10_1$ and is finally introduced into the exit aperture 12.

Also the diffuse radiation incidented at the range between $L_1$ through $L_2$ is merely reflected on the portion $10_2$ and is introduced into the exit aperture 12. However, the diffuse radiation incidented at the range from the center $L_0$ of the entrance aperture 11 through $L_1$ cannot be satisfactorily introduced into the exit aperture 12. This is based on the relatively large tapered angle $\theta_1$ of the portion $10_1$. For this reason, the additional lens system 14 is provided on the longitudinal axis of the cylinder 10, so that the concentrating and introducing of the diffuse radiation between $L_0$ and $L_1$ into the exit aperture 12 can be achieved.

Another embodiment of the present invention is shown in FIG. 2. The cylinder 10 is provided with three portions $10_1$, $10_2$ and $10_3$. Supposing that $\theta_1 = 10°$, $\theta_2 = 5°$, $\theta_3 = 2.5°$, $X_1 = 9.4$ mm, $X_2 = 9.9$ mm, $X_3 = 14.7$ mm, $Y_1 = 53.3$ mm, $Y_2 = 112.6$ mm, $Y_3 = 394$ mm, $\phi_0 = 10$ mm and $\phi_3 = 77.9$ mm, then the following relation can be derived.

$$\phi_3^2/\phi_0^2 \approx 60.7$$

Thus, the optical energy at the exit aperture 12 will be about 60 times the density than that of the entrance aperture 11.

A further embodiment of the present invention is shown in FIG. 3. The cylinder 10 is provided with four portions $10_1$, $10_2$, $10_3$ and $10_4$. Supposing that $\theta_1 = 20°$, $\theta_2 = 10°$, $\theta_3 = 5°$, $\theta_4 = 2.5°$, $X_1 = 7.7$ mm, $X_2 = 17.1$ mm, $X_3 = 31.0$ mm, $X_4 = 51.4$ mm, $Y_1 = 21.1$ mm, $Y_2 = 53.3$ mm, $Y_3 = 157.0$ mm, $Y_4 = 467$ mm, $\phi_0 = 10$ mm, $\phi_1 = 25.4$ mm, $\phi_2 = 44.2$ mm, $\phi_3 = 112.8$ mm and $\phi_4 = 153.6$ mm, then the following relation can be derived.

$$\phi_4^2/\phi_0^2 \approx 236$$

Thus, the optical energy at the exit aperture 12 will be about 236 times the density than that at the entrance aperture 11.

As can be easily recognized from the above description, by using the cylinder according to the present invention, substantially all of the parallel components of the diffuse radiation incidented from the entrance aperture 11 can be introduced into the optical conductor cable 13. Thus, the use of a plurality of said cylinders, each having its entrance aperture on the same plane, is of benefit in increasing the collection of the solar energy.

In the preferred embodiments of this invention, the apparatus is described as being cylindrical in form; however, square or polygon forms can be used so as to eliminate spaces between the circular entrance aperture, which occurs in the case of the cylinder being used.

Should the container take the shape of a square or polygon form, the container would include a plurality of discrete reflective tapered surfaces continguously arranged in succession along the length of the container. Each surface would be linear when viewed in longitudinal cross-section.

The invention has been described in detail with particular reference to preferred embodiments thereof, but it will be understood that reasonable variations and modifications are possible without departing from the spirit and scope of the invention.

I claim:

1. A sunlight collector used, in particular, for collecting diffuse radiation of sunlight comprising:
    a cylinder having a relatively wide entrance aperture, for receiving the parallel components of diffuse radiation which are parallel to the longitudinal axis of the cylinder, and a relatively narrow circular exit aperture, for introducing concentrated diffuse radiation in said cylinder into a light conductor;
    an inner wall of said cylinder having a countable number of discrete conical surfaces contiguously arranged in series along the axis of the cylinder and having substantially a total reflection surface on each of said conical surfaces, each of said surfaces being linear when viewed in longitudinal cross-section; and
    the angle of each of said conical surfaces is increased from the top to the bottom of the cylinder, so that the incidented diffuse radiation from said entrance aperture is reflected on said tapered surfaces and concentrated into said exit aperture for introduction into said light conductor.

2. A sunlight collector according to claim 1, wherein the angle of each of said conical surfaces is not more than two times that of the tapered surface arranged upstream thereof.

3. A sunlight collector according to claim 1 wherein said inner wall of said cylinder comprises no more than four discrete conical surfaces.

4. A device for collecting and concentrating diffuse radiation of sunlight for introduction into a light conductor, said device comprising:
    a container having a longitudinal axis, an entrance aperture for receiving components of diffuse radiation which are substantially parallel to said axis, a circular exit aperture, and at least one inner wall including three discrete conical surfaces contiguously arranged in succession along the length of said container from said entrance aperture to said exit aperture, each of said surfaces providing an area of total reflection, each of said surfaces being linear when viewed in longitudinal cross-section;
    whereby incident diffuse radiation entering said container through said entrance aperture is reflected on said tapered surfaces and concentrated thereby into said exit aperture for introduction into a light conductor.

5. The collector device according to claim 4 wherein each of said conical surfaces is arranged at an angle of inclination with respect to a line parallel to said axis, said angles of inclination increasing from said respective surface nearest said entrance aperture to said respective surface nearest said exit aperture.

6. The collector device according to claim 5, wherein each of said angles of inclination is less than said angle of inclination of said respective surface upstream therefrom.

7. A device for collecting and concentrating diffuse radiation of sunlight for introduction into a light conductor, said device comprising:

a container having a longitudinal axis, an entrance aperture for receiving components of diffuse radiation which are substantially parallel to said axis, a circular exit aperture, and at least one inner wall including three discrete conical surfaces contiguously arranged in succession along the length of said container from said entrance aperture to said exit aperture, each of said surfaces providing an area of total reflection and being conformed so that when viewed in longitudinal cross section, said surfaces appear as linear;

each of said conical surfaces arranged at an angle of inclination with respect to a line parallel to said axis, said angles of inclination increasing from said respective surface nearest said entrance aperture to said respective surface nearest said exit aperture;

whereby incident diffuse radiation entering said container through said entrance aperture is reflected on said tapered surfaces and concentrated thereby into said exit aperture for introduction into a light conductor.

8. A sunlight collector according to claim 7 wherein the angle of each of said conical surfaces is increased from the top to the bottom of the container.

* * * * *